Figure 10:
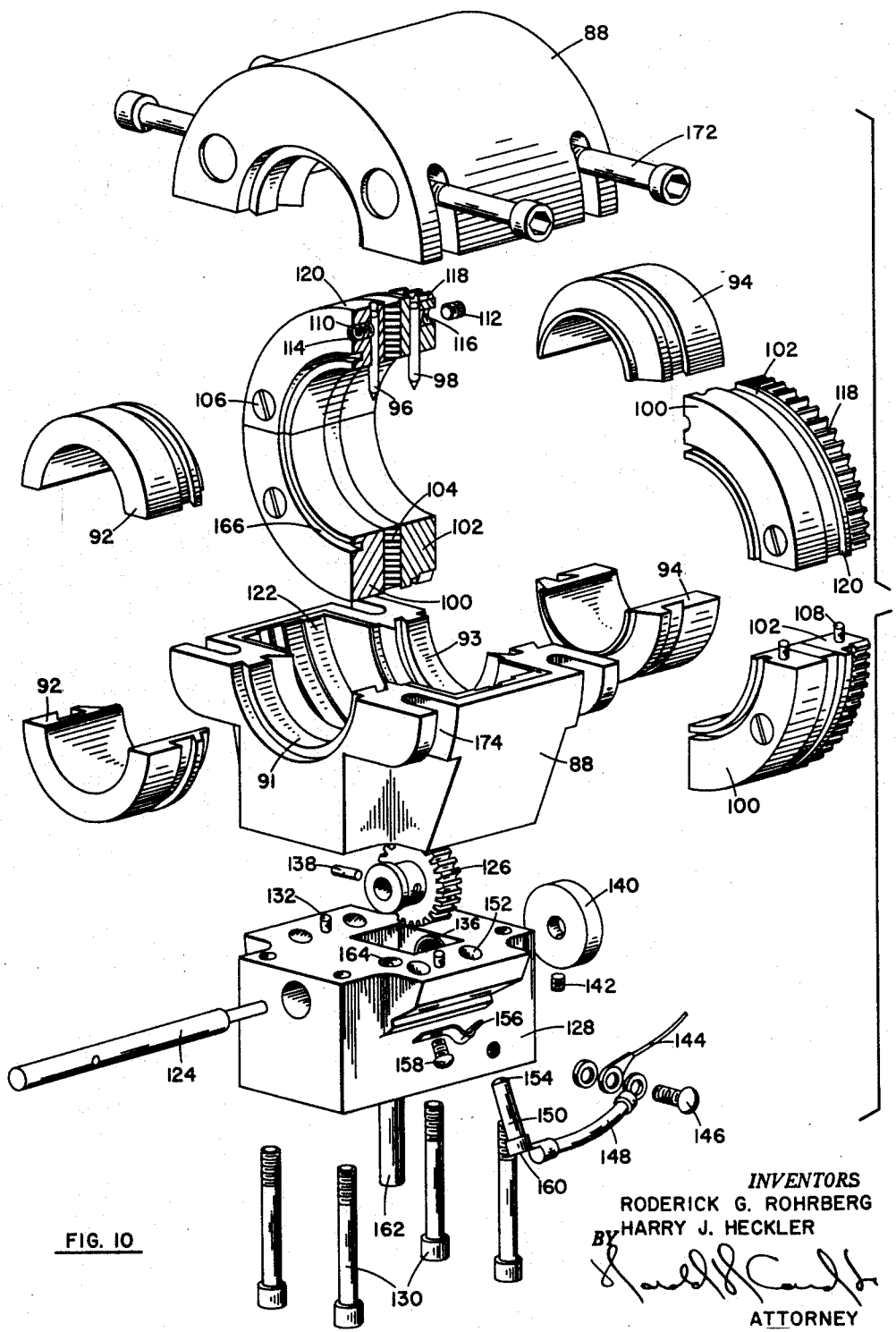

July 13, 1965     R. G. ROHRBERG ETAL     3,194,936
WELDED CONNECTION, METHOD AND APPARATUS
Filed March 30, 1962     3 Sheets-Sheet 1
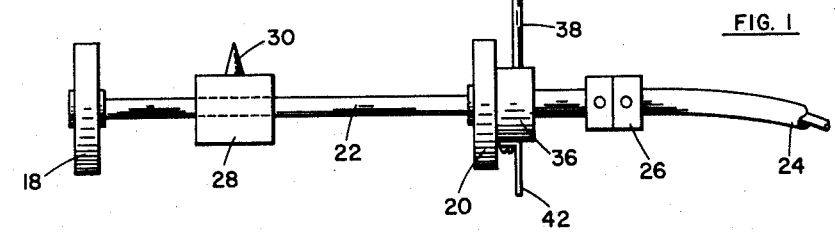
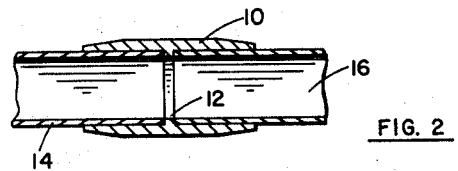
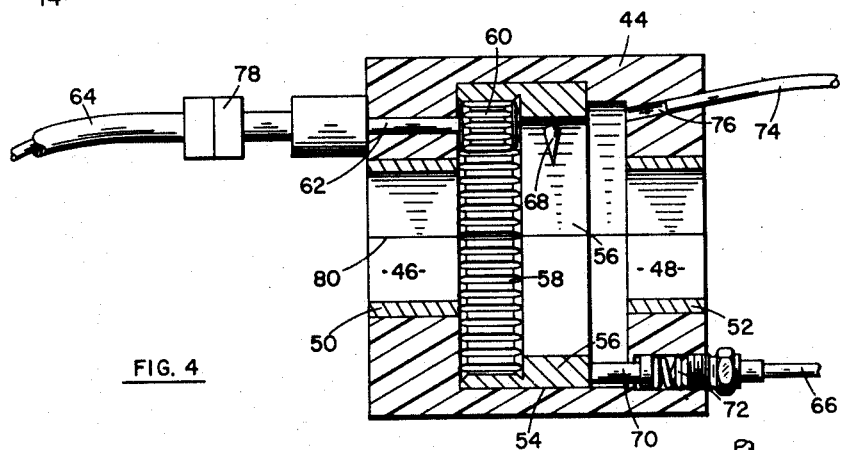
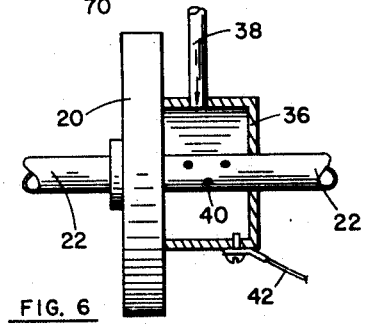
INVENTORS
RODERICK G. ROHRBERG
BY HARRY J. HECKLER
ATTORNEY

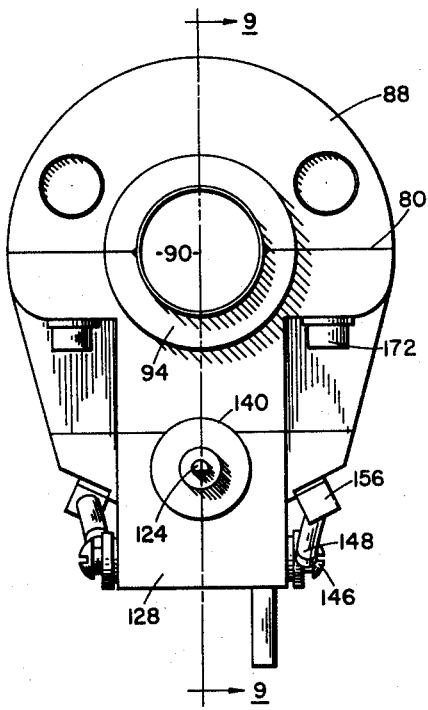
FIG. 8
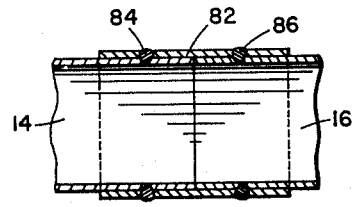
FIG. 7
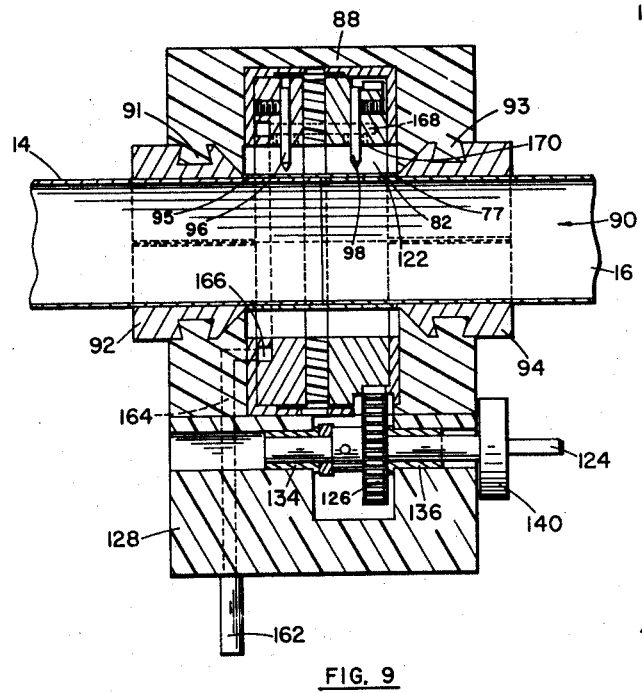
FIG. 9
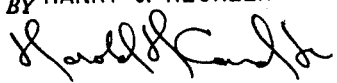

INVENTORS
RODERICK G. ROHRBERG
HARRY J. HECKLER
BY
ATTORNEY

United States Patent Office 3,194,936
Patented July 13, 1965

3,194,936
WELDED CONNECTION, METHOD AND APPARATUS
Roderick G. Rohrberg, Inglewood, and Harry J. Heckler, Torrance, Calif., assignors to North American Aviation Co., Inc.
Filed Mar. 30, 1962, Ser. No. 183,891
15 Claims. (Cl. 219—60)

This invention relates to an improved type of connection as well as method and apparatus for forming such connection. More particularly, the invention contemplates improved method and means for fusion welding plates along a circumferential path to form a novel tubular conduit connection by compact, portable and lightweight apparatus such as required for in-place welding of small workpieces in crowded installations.

Although the invention is of wide applicability in forming a variety of diverse joints or connections between elements of different forms and materials for various purposes, it will be described for the sake of illustration in connection with tubes or conduits used in aircraft and high speed aerial or space vehicles. It will be understood that the scope of the inventive concept is in no sense limited by any of the specific details used to explain the invention, except as determined by reference to the accompanying claims.

Vehicles of the stated type are characterized by a high degree of complexity which, combined with the need for efficient use of all available space, results in extremely crowded internal conditions. Tubes and conduits such as required for hydraulic lines or other systems in the stated environment are usually formed in separate sections of various shapes as required to route them through compartments and bulkheads. The abutting ends of adjacent conduit sections must be aligned and secured to each other by means which will maintain the continuity of flow within the conduit or tube and prevent leakage at the joint formed between the sections. The stated joints are required to be of great strength inasmuch as fluid conduits in vehicles of the stated type are normally affixed to the vehicle frame and are therefore affected both by vibration and by deflections in the frame such as would tend to loosen, distort or otherwise adversely affect the alignment of the separate conduit sections, the structure used to maintain such alignment, or leakage properties of the joints. Deflections of the fuselage and wing structure in vehicles of the type mentioned above are frequently encountered due to aerodynamic and inertia loads imposed on the vehicles during their operation.

The choice of suitable method and means for securing adjacent conduit or tube sections of the stated type is greatly influenced by the need for minimum size and weight of structural components for use in ultra-high speed aerial and space vehicles. Moreover, flow systems involving extreme fluid temperature and stress conditions such as 4000 p.s.i. and 500° F. require use of materials of construction formerly unknown in the fabrication of conventional supersonic aircraft. Notable among such materials are the so called advanced alloys of precipitation hardenable stainless steel, of which the alloy designated as AM350 stainless steel is illustrative. The component elements and general range of percentage composition by weight for AM350 stainless steel is as follows:

| | Percent |
|---|---|
| Carbon | 0.08–0.12 |
| Manganese | 0.75–1.25 |
| Silicon maximum | 0.50 |
| Phosphorous do | 0.04 |
| Sulfur do | 0.03 |
| Chromium | 16.00–17.00 |
| Nickel | 0.00–5.00 |
| Molybdenum | 2.50–3.25 |
| Nitrogen | 0.07–0.13 |
| Iron | Balance |

While the stated precipitation hardenable alloys including AM350 stainless steel provide great strength at extreme environmental temperatures when used in fluid conduits or tubing, such materials are characterized by a reduction in strength when heated excessively. Thus, for example, during a welding operation to join workpiece materials of precipitation hardenable stainless steel in the hardened conditions, the application of welding heat in an amount sufficient to fuse the workpiece materials causes annealing and consequent weakening of the material in the zone of fusion and in the base metal closely adjacent thereto. In an attempt to avoid some of the foregoing difficulties, resort has been had to brazed sleeve type joints between abutting ends of tubular conduits. However, it has been found that the application of brazing heat, since the amount thereof is considerably higher than the annealing temperature for precipitation hardenable steels, often aggravates the problem due to its excessive weakening effect upon the completed joint. Moreover, the cost of brazed tubing connections is relatively much higher than any alternative structural expedient suitable for mass production use heretofore known, particularly due to the extremely close tolerances required between the faying surfaces of the brazed joint, requiring precision machining and otherwise elaborate preparation of the workpiece components prior to actual brazing thereof.

Accordingly, it is a principal object of the invention in this case to provide improved connection method and means for securing adjacent separate sections of tubular conduits or the like to each other at the adjoining ends thereof.

It is a further object of this invention to provide improved connection method and means as set forth in these objects suitable for use in an environment characterized by high pressure, high temperature, and vibration of diverse frequencies and amplitudes for prolonged periods.

It is also an object in this case to provide an improved conduit connection as set forth in these objects characterized by superior strength and performance reliability.

It is also an object in this case to provide a conduit connection as set forth in these objects which is capable of installation in crowded equipment areas providing severely limited working space around the stated connection.

Other objects and advantages of the instant invention will become apparent upon a close reading of the following detailed description of an illustrative embodiment of the invention, reference being had to the accompanying drawings, wherein:

FIGURE 1 shows a sleeve of cylindrical form adapted to form a welded tube joint according to the teachings disclosed herein, FIGURE 2 shows the assembled components of a joint formed according to the novel principles disclosed herein prior to welding thereof, FIGURE 3 shows a simplified structural schematic view in elevation of one form of apparatus adapted to accomplish welding of a conduit connection such as shown in FIGURE 2, FIGURE 4 shows a simplified structural schematic view in elevation of another form of apparatus adapted to accomplish welding of the joint shown in FIGURE 2 and differing from the apparatus of FIGURE 3, FIGURES 5 and 6 show isolated views, partly in cross-section of portions of the structure shown in FIGURE 3, FIGURE 7 shows a cross-sectional view taken through a joint formed according to the inventive principles disclosed herein and modified slightly with respect to the embodiment shown in FIGURE 2, FIGURE 8 shows an end view in elevation of a fixture adapted to perform welding as required to produce the joint shown by FIGURE 8, FIGURE 9 shows a cross-sectional view of the apparatus shown in FIGURE 9 and taken along line 9—9 of FIGURE 8, FIGURE 10 shows an exploded view in perspective, partly in cross-section, of the apparatus shown in FIGURES 8 and 9.

Referring to the drawings described briefly above and particularly to FIGURES 1 and 2, it may be seen that the invention in this case includes a welded tubular conduit connection wherein a metallic sleeve 10 having an annular projection or ridge 12 shown in FIGURE 1 is axially aligned and positioned over the confronting ends of two adjacent conduit sections 14 and 16 with the terminal edges of the stated conduit ends separated by the stated ridge as shown in FIGURE 2. With the workpiece components arranged generally in the stated manner, the joint is formed by applying heat in the area of contact between ridge 12 and the confronting ends of conduit sections 14 and 16 in an amount sufficient to fuse together the workpiece materials therein. Fusion of the materials in conduits 14 and 16 with sleeve 10 in the area of ridge 12 may be effected by the application of welding heat either externally or internally with respect to the assembled components.

Apparatus which may be used for many different purposes in addition to the particular uses suggested herein is schematically shown by FIGURES 3 and 4, either modification of which may accomplish the welding of sleeve 10 and conduit sections 14 and 16. Considering FIGURE 3, the apparatus for internal application of heat may be seen to include wall means in the form of a pair of generally disc shaped elements 18 and 20 of relatively stiff, dielectric material sized to fit snugly but slidably within conduit sections 14 and 16. A hollow electrically conductive tube or shaft 22 is rotatably journalled in the center of discs 18 and 20 and supported therebetween. Driving means for rotation of shaft 22 relative to stationary discs 18 and 20 are provided in the form of flexible cable 24 which may be connected with a remote power source (not shown) such as an electric motor. The turning force of cable 24 is transmitted to shaft 22 through a dielectric coupling 26. A hollow mounting block 28 is affixed on tube 22 to provide movable support means for a source of welding heat in the form of tungsten electrode 30, the central axis of which lies substantially perpendicular to the longitudinal axis of tube 22. Referring to FIGURE 5 it may be seen that the hollow interior of mounting block 28 communicates with hollow tube 22 through a plurality of holes 32. Moreover, mounting block 28 is provided with a plurality of holes 34 through the walls thereof situated proximate the electrode 30 whereby a suitable inerting gas flowing through tube 22 and into hollow mounting block 28 through holes 32 may thereafter escape through holes 34 surrounding electrode 30. A hollow manifold 36 mounted on disc 20 as shown by FIGURE 3 communicates with tube 22 whereby the stated inerting gas may be introduced through a suitable conduit connection 38 to reach the interior of hollow tube 22 by a plurality of holes 40 communicating the interior of manifold 36 with the interior of tube 22 as shown in FIGURE 6. Manifold 36 may be electrically conductive whereby suitable power connection 42 may supply current through the material in manifold 36, tube 22 and block 28 to cause welding by electrode 30. From the foregoing description of structure, it will be understood that discs 18 and 20 may be inserted within conduit sections 14 and 16 to provide bearing support at either end of tube 22, and situated in relationship with sleeve 10 whereby electrode 30 may be rotated within the assembled workpiece components to provide a circular welding path generally coinciding with ridge 12. In addition to providing bearing support for tube 22, discs 18 and 20 when operatively positioned in workpiece components 10, 14 and 16 may be seen to form chamber means whereby inert gas from holes 34 surrounds the weld area with gas by filling the entire space within the walls and conduits 14 and 16 and between the discs 18 and 20.

Apparatus for applying welding heat externally with respect to sleeve 10 may be seen from FIGURE 4 to include a generally cylindrical housing 44 with a circular opening on either side thereof as indicated at 46 and 48, each opening being provided with a bushing 50 and 52, respectively, of dielectric material. Housing 44 contains an annular cavity 54 which functions as bearing support means for an electrically conductive ring 56 at one side of which an internal ring gear 58 is integrally joined. A pinion 60 rotatably journalled within housing 44 on a shaft 62 may be rotated by external means such as flexible cable 64 or the like acting through dielectric coupling 78. Electrical power supplied by appropriate connection 66 through housing 44 and ring 56 acts through a small tungsten electrode 68 affixed in the periphery of ring 66 and directed radially inwardly as shown in FIGURE 4. Suitable electrically conductive bearing means between housing 44 and rotatable ring 56 to insure positive and continuous electrical contact therebetween may be provided as shown by carbon element 70 mounted in housing 44 and forced by spring means 72 into close and continuous bearing contact with ring 56. Means for supplying a suitable inerting gas in the weld area are provided in the form of external conduit 74 and passage 76 in housing 44. From the foregoing description of structure, it may be seen that housing 44 and ring 56 together with gear 58 may advantageously be split along a common plane of separation as indicated at 80 whereby the stated parts may be assembled around sleeve 10 with insulating members 50 and 52 in bearing contact with the outer surfaces of conduit sections 14 and 16. In the stated operative relationship, pinion 60 may be rotated by cable 64 while electrical power is simultaneously applied to tungsten electrode 68 and inerting gas flow is maintained through conduit 74. Electrode 68 will thus describe a circular path around sleeve 10 and externally thereof but aligned with ridge 12, resulting in fusion of the materials in conduit sections 14 and 16 with sleeve 10.

FIGURE 7 shows a conduit connection differing slightly from that suggested by FIGURE 2, but embodying the same basic inventive principles. Thus, it may be seen from FIGURE 7 that conduit sections 14 and 16 are arranged with their ends in abutting relationship and surrounded by a generally cylindrical sleeve 82. With the workpiece components arranged in the manner described and shown, heat is applied to form two spaced apart annular weld beads 84 and 86 around sleeve 82 fusing the material therein to conduit sections 14 and 16, respectively.

An illustrative embodiment of apparatus for applying welding heat as required to produce the conduit connection of FIGURE 7 is shown in FIGURES 8, 9 and 10. Referring to FIGURES 8 and 9, the stated apparatus may be seen to include a housing 88 of suitable dielectric material, such as various known ceramics or the like. Housing 88, as shown by FIGURE 8, for example, is divided into two main portions by plane of separation 80, and has a generally cylindrical opening through the housing as indicated at 90, sized to accommodate conduit sections 14 and 16 together with sleeve 82 as shown in FIGURE 9. A pair of oppositely facing metallic bushings 92 and 94 serve to contact the workpiece components on either side of housing 88, and may be secured to the housing by appropriate means such as the interlocking annular keyway arrangement designated 91 and 93 and shown in FIGURES 9 and 10. When the workpiece components are supported between bushings 92 and 94, oppositely facing edges 95 and 97 on bushings 92 and 94, respectively, contact the opposite ends of generally elongate cylindrical sleeve 82 and serve to control the position of the sleeve in response to axial movement of housing 88. Thus, an index mark suitably located on either conduit section 14 or 16 at a predetermined distance from the end thereof could be used to position housing 88 whereby the action of edges 95 and 97 on busings 92 and 94 would center sleeve 82 precisely over the plane of abutment between sections 14 and 16. Also, when properly positioned in the foregoing manner, a pair of electrodes 96 and 98 will be situated with respect to the components whereby weld beads 84 and 86 formed by the electrodes will be properly located.

Referring to FIGURE 10, it may be seen that electrodes 96 and 98 are mounted in two metallic rings 100 and 102, respectively, which are separated by an intermediate dielectric mass 104. Elements 100, 102 and 104 are divided into two halves by plane of separation 80, and each half of the assembly thus formed may be held securely together by a plurality of screws such as shown at 106 of dielectric material. Moreover, the two stated halves may be assembled in proper alignment and thus maintained by a plurality of indexing pins such as indicated at 108 operatively related with a plurality of aligning holes within which the pins are adapted to be securely held when welding rings 100 and 102 are in the assembled state. Adjusting means for adjusting the arcing distance between electrodes 96 and 98 with respect to the workpiece are provided in the form of set screws 110 and 112 threadedly engaging holes 114 and 116 in welding rings 100 and 102, respectively, and bearing against electrodes 96 and 98 as shown in FIGURE 10. Means to apply rotative force for rotating welding rings 100 and 102 are provided in the form of external ring gear 118 which may be integrally formed on welding ring 102 as shown in FIGURE 10, for example. Bearing surfaces such as indicated at 120 are provided on welding rings 100 and 102 for supporting contact with oppositely corresponding surfaces of recess 122 in housing 88 within which the welding ring assembly is adapted to rotate.

Driving means for applying force to rotate welding rings 100 and 102 are provided in the form of a drive shaft 124 operatively related to a pinion 126 and mounted within a gear box 128 adapted to be secured to the lower end of housing 88 by a plurality of mounting bolts 130 as shown, for example, in FIGURE 10. Indexing means such as pins 132 adapted to fit within indexing holes appropriately located in housing 88 aid in properly positioning gear box 128 during assembly of the fixture. As seen from FIGURE 9, gear box 128 includes support means for a pair of bushings 134 and 136 within which drive shaft 124 is journalled for rotation. Pinion 126 is affixed to drive shaft 124 between bushings 134 and 136 by appropriate means such as shear pin 138 operatively related in interlocking relationship between pinion 126 and shaft 124. Additional lateral stability for drive shaft 124 is provided in the form of a disc 140 affixed to the drive shaft by suitable means such as set screw 142 shown in FIGURE 10.

Means are provided for the connection of welding rings 100 and 102 with a suitable source of electric power (not shown). The stated means include a wire lead 144 externally connected to gear box 128 and secured thereto by screw 146 which also holds shielded conductor 148 in close electrical contact with lead 144. Conductor 148 is connected with slidable pin 150 which is slidably mounted within an access hole 152 in gear box 128 and arranged so that one end 154 of pin 150 is adapted to bear against surface 120 of welding ring 102 while a leaf spring 156 externally attached to gear box 128 by screw 158 applies resilient force to the opposite end 160 of pin 150 to force the pin into close and continuous engagement with the welding ring. Since gear box 128 is fabricated from dielectric material, it will be understood that a current path is provided by the structure disclosed above whereby electrical current from external wire lead 144 is conducted through welding ring 102 to electrode 98 and is isolated from electrode 96. A separate and independent current path corresponding to the stated arrangement described above in connection with electrode 98 is similarly provided for electrode 96 on the side of gear box 128 opposite from the location of pin 150. Both electrical configurations described above involve suitable connection with the workpiece components whereby the workpiece is grounded and in circuit with either of electrodes 96 or 98.

To reduce the adverse effects of oxidation during the welding process, means are further provided in the welding fixture disclosed herein for supplying an inert gas to the welding area. The stated means include suitable external attachment means such as conduit 162 which communicates with an internal passage 164 in gear box 128 and housing 88 whereby inert gas flowing into conduit 162 is communicated to an annular groove 166 formed in welding ring 100 as shown, for example, in FIGURES 9 and 10. As best seen from FIGURE 9, a passage 168 extends through welding rings 100 and 102 as well as dielectric mass 104 and communicates with recess 122 by means of a plurality of minute holes 170 whereby inert gas within annular groove 166 is communicated through passage 168 and holes 170 to the welding area in close proximity with electrodes 96 and 98.

Operation

Although the apparatus shown in FIGURES 8, 9 and 10 and discussed above may be used for the application of heat to a variety of diverse materials, workpieces, and for different purposes, its operation need not in any case differ materially from that described below for the sake of illustration. Prior to use of the apparatus for welding conduit connections, the workpiece components to which heat is to be applied must first be positioned in the desired final relationship. Thus, conduit sections 14 and 16 are aligned in abutting relationship about a common longitudinal axis, with sleeve 10 centered over the plane of abutment as shown, for example, in FIGURE 9.

With the workpiece components properly arranged as discussed above, the two halves of welding rings 100 and 102 may be positioned in operative relationship with the stated components as shown, for example, in FIGURE 9. Placement of the welding rings in the stated relationship will be facilitated by contact of aligning pins 108 extending between the ring halves.

After positioning of welding rings 100 and 102 and parts affixed thereon in the manner set forth above, the lower portion of housing with gear box 128 secured thereto and the lower halves of bushings 92 and 94 properly mounted thereon is positioned in operative relationship with the assembled workpiece components by moving the housing into position with welding rings 100 and 102 whereby the rings become properly seated within recess 122 and pinion 126 becomes properly engaged with the gear teeth on gear 118. Thereafter, the upper portion of housing 88 is placed in mating contact with the lower portion of the housing and secured thereto by studs 172 extending from the upper portion of housing 88 and operatively engaging slots 174 appropriately formed in the lower portion of the housing.

Upon completion of the assembly procedures as described above, appropriate electrical and inert gas connections may be made with the welding fixture and with the workpiece to ground either or both conduit sections 14 and 16, and a flow of inert gas through holes 170 may precede the actual flow of welding current whereby oxidation and other adverse effects on the workpiece components which might otherwise occur in the heated state are avoided. Flow of the inerting agent is continuously maintained throughout the welding operation. Since the inerting agent may be at a relatively low temperature, the stated procedure provides the additional advantage of cooling the workpiece components in the areas thereof except where welding heat is applied, thus helping to avoid annealing of the workpiece material. With the current path established to one of the electrodes 96 or 98, welding may be accomplished by the stated electrode through application of electrical power thereto during simultaneous rotation of pinion 126 by suitable external means such as an electric motor operating through a flexible cable (not shown) connected to driveshaft 124. After one of the weld beads such as 84 or 86 as shown in FIGURE 7 has been formed by the procedure described above, the external electrical connection such as designated by reference numeral 144 in FIGURE 10 is removed from one side of gear box 128 and attached to the other side of gear box whereby the other welding electrode may be actuated, and the procedure discussed above is repeated so that the other weld bead will be formed. Thus, the joint shown in FIGURE 7 may be achieved by the independent operation of the two electrodes 96 and 98, although where power supply circuit and workpiece properties permit, both electrodes could conceivably be simultaneously operated. Following completion of the conduit connection, studs 172 may be loosened and housing 88 may be separated from around the workpiece components after which welding rings 100 and 102 may be similarly separated and removed.

While fabrication of the joint shown in FIGURE 7 has been illustratively described only in connection with the structure shown in FIGURES 8, 9 and 10, it will be understood by those skilled in the art that the same joint could also be fabricated by two electrodes mounted as shown in the embodiment of FIGURES 3, 5 and 6 adapted to apply welding heat from within sleeve 82. Where more than two weld seams such as 84 and 86 are desired, it is also within the scope of the invention in this case to provide 3, 4 or any number of electrodes in the welding fixture, all mounted generally as disclosed herein.

From the description of structure and its operation as set forth above and shown in the drawings, it may be seen that the invention disclosed herein provides novel means for applying heat such as required for welding operations in relatively remote and inaccessible areas. The fixture shown, for example, in FIGURE 10 has been found extremely efficient and compact, and is readily adaptable for welding a variety of different workpiece shapes and sizes, such as elbows, T's, crosses, reducers and the like. The feature which permits separation of the fixture along a common plane and assembly thereof about an immovable and inaccessible workpiece permits great versatility in use of the fixture.

The ease of installation afforded by the various features described above makes possible the use of the fixture for in-place welding of various fluid lines and conduits, thus avoiding the necessity for disassembling and removing portions of structure from an aircraft, missile or other vehicle as required for bench welding in a workshop. Thus, heat is concentrated at the precise location where welding is accomplished, and is contained within a small local area whereby other lines or structural elements situated close to the welding area are not affected by welding heat. Moreover, the novel conduit connection resulting from use of the apparatus disclosed herein in the stated manner has been found to possess superior strength with regard to internal fluid pressures and to external loads. Thus, for example, sleeves 10 or 82 shown in FIGURES 2 and 7, respectively, provide considerable bearing support around the outer surface of conduit sections 14 and 16 on either side of the weld areas, thus providing increased wall strength in the precise areas where annealing, if any occurs, would result from the welding operation. In addition, since welding heat applied by electrodes 96 and 98 produces a zone of fusion which may completely penetrate the workpiece materials in the conduit sections and surrounding sleeve, the clearance or looseness of fit between the workpiece components before fusion thereof is relatively unimportant in the novel method and apparatus disclosed herein compared with brazing of conduit connections. An extremely close fit in brazed conduit connections is necessary to achieve a strong, leak-proof joint, and this requirement adds considerably to the cost of brazed connections due to precision machining operations, accurate tube-sizing, honing and other elaborate manufacturing steps. Accordingly, the novel conduit connection disclosed herein results in a significant economic advantage over brazed connections. Moreover, since welding heat is concentrated in a localized area, the annealing effects associated with heating of the entire conduit ends and surrounding sleeve as necessary in brazing are generally attenuated as a result of the invention disclosed herein.

It is also within the scope of the inventive concept in this case to provide a single fusion weld comprising an annular weld bead generally within the plane of abutment defined by the confronting ends of tubes or conduits 14 and 16 shown in FIGURE 7, instead of the two separate annular weld beads 84 and 86 shown in the stated figure. Thus, the material in sleeve 82 and in conduits 14 and 16 could be united by a single weld bead at the center of the sleeve rather than two weld beads on either side of the plane of abutment as shown in the stated figure.

While the particular details set forth above and in the drawings are fully capable of attaining the objects and providing the advantages herein stated, the structure and method thus disclosed are merely illustrative and could be varied or modified to produce the same results without departing from the scope of the inventive concept as defined in the appended claims.

We claim:

1. In welding apparatus for forming an annular weld bead on a substantially cylindrical workpiece portion; stationary chamber means including a chamber for surrounding the weld area with an inert gas, movable support means mounted within said chamber for rotation relative to said chamber means and said workpiece, a source of welding heat mounted on said movable support means, means for supplying inert gas to said chamber, and means for causing rotation of said movable support means during the application of welding heat to said portion by said source whereby said annular weld bead is formed on said workpiece portion.

2. The structure set forth in claim 1 above wherein said workpiece is hollow and said stationary chamber means includes at least two spaced-apart wall means fitting within said workpiece and defining therewith said closed chamber.

3. The structure set forth in claim 2 above wherein said movable support means includes a shaft supported between said spaced apart wall means.

4. The structure set forth in claim 3 above wherein said shaft is electrically conductive, said spaced-apart wall means are dielectric, said source of welding heat comprises at least one electrode, and further including means supplying welding current to said electrode through said shaft.

5. The structure set forth in claim 3 above wherein said shaft is hollow, and said movable support means includes a hollow block mounted on said shaft and communicating with the interior thereof, said hollow block having a plurality of holes in the outer wall surface thereof for flowing said inert gas into said chamber, and said means for supplying said inert gas includes means for flowing said gas into said hollow shaft and thence into said hollow block.

6. The structure set forth in claim 3 above wherein said drive means includes a flexible cable connected to cause rotation of said shaft relative to said spaced-apart wall means.

7. The structure set forth in claim 1 above wherein said stationary chamber means comprises a hollow housing adapted to surround said workpiece externally thereof.

8. The structure set forth in claim 7 above including in addition thereto, positioning means on said housing for positioning said housing in operative relationship with said workpiece.

9. The structure set forth in claim 7 above wherein said movable support means includes an arcuate element journalled for rotational movement within said hollow housing, said arcuate element being operatively situated externally of said workpiece.

10. The structure set forth in claim 9 above wherein said arcuate element comprises an electrically conductive ring and said source of welding heat comprises at least one electrode.

11. The structure set forth in claim 10 above wherein said driving means includes a ring gear formed on said ring, and a pinion operatively engaging said ring gear.

12. The structure set forth in claim 11 above wherein said housing and said ring and said ring gear are each divided by a common plane of separation into two portions adapted to be operatively joined around said workpiece and separated for removal therefrom.

13. Welding apparatus for progressively fusion welding along an annular path on a generally cylindrical portion of a workpiece, said apparatus comprising:
an elongate electrode,
an electrically conductive ring adapted to surround said workpiece portion,
mounting means for mounting said electrode in said ring in operative relationship with said workpiece portion,
a dielectric housing for slidably supporting said ring on said workpiece,
an external ring gear on said ring,
drive gear means operatively engaging said ring gear to cause rotation of said ring relative to said housing, and
power means connected to said electrode for causing an electrical arc between said electrode and said workpiece portion during rotation of said ring.

14. The structure set forth in claim 13 including in addition thereto:
means for supplying an inert gas in the vicinity of said arc, said means comprising:
first passage means in said housing adapted to receive a flow of inert gas from an externally connected source,
annular groove means formed in said ring communicating with said first passage means, and
second passage means in said ring communicating with said groove means for causing said inert gas to surround said electrode in the vicinity of said arc.

15. Welding apparatus for progressively fusion welding along a plurality of spaced-apart annular paths on a generally cylindrical portion of a workpiece, said apparatus comprising:
a plurality of elongate electrodes,
a plurality of electrically conductive rings adapted to surround said workpiece portion,
mounting means for mounting each of said electrodes in a separate one of each said rings in operative relationship with said workpiece portion,
a dielectric mass situated between said rings to maintain said rings in spaced-apart and non-conducting relationship with each other,
a dielectric housing for enclosing and slidably supporting said rings on said workpiece,
an external ring gear affixed on at least one of said rings,
drive gear means operatively engaging said ring gear to cause rotation of said rings relative to said housing,
joining means for securing together in relatively immovable relationship said rings and said ring gear, and
power means connected to said electrodes for causing an electrical arc between each of said electrodes and said workpiece portion during rotation of said ring.

References Cited by the Examiner

UNITED STATES PATENTS

| | | | |
|---|---|---|---|
| 1,220,772 | 3/17 | Murray | 219—60 |
| 1,293,871 | 2/19 | Murray | 285—111 |
| 1,700,319 | 1/29 | Kjekstad | 285—111 |
| 2,224,145 | 12/40 | Dugan et al. | 113—112 |
| 2,496,188 | 1/50 | Wiese | 113—59 |
| 2,654,014 | 9/53 | Schaefer | 219—60 |
| 2,788,430 | 4/57 | Oakley | 219—74 |
| 2,914,653 | 11/59 | Ernst | 219—125 |
| 3,068,343 | 12/62 | Rossner | 219—60 |
| 3,069,529 | 12/62 | Gotch | 219—60.1 |
| 3,084,243 | 4/63 | Gotch | 219—60 |

RICHARD M. WOOD, *Primary Examiner.*